United States Patent

Reynolds

[15] 3,700,860

[45] Oct. 24, 1972

[54] DATA STORAGE AND TRANSFER APPARATUS FOR PLURAL-VEHICLE IDENTIFICATION SYSTEM

[72] Inventor: Christopher C. Reynolds, Homewood, Ill.

[73] Assignee: Servo Corporation of America, Hicksville, N.Y.

[22] Filed: July 26, 1971

[21] Appl. No.: 165,480

[52] U.S. Cl....235/61.11 E, 340/146.3 K, 340/147 A

[51] Int. Cl....G06k 7/10

[58] Field of Search...343/6.5, 6.8, 7.7; 235/61.11 E; 340/146.3 K, 147 R, 147 A, 147 LP, 147 PC; 250/219 D

[56] References Cited

UNITED STATES PATENTS

| | | |
|---|---|---|
| 3,417,231 | 12/1968 | Stites et al...235/61.11 E |
| 3,553,433 | 1/1971 | Sorli...235/61.11 E |
| 3,617,704 | 11/1971 | Kapsambelis et al.340/146.3K |

*Primary Examiner*—Thomas A. Robinson

*Attorney*—David S. Kane, Daniel H. Kane, Philip T. Dalsimer, Joseph C. Sullivan, John Kurucz, James J. Salerno Jr., Martin E. Goldstein, Charles R. Hoffman, Gerald Levy, Charles P. Bauer, Peter C. Van Der Sluys and Peter Saxon

[57] ABSTRACT

A system for identifying a carrier vehicle and piggyback vehicles positioned thereon. Each of the vehicles is equipped with an information-coded label, the information encoded in the carrier vehicle label and in the piggyback vehicle labels including features distinguishing the two types of labels and, therefore, the two types of vehicles, from each other. As the carrier and piggyback vehicles move through a label-reading area, a scanning apparatus senses the information encoded in the various labels and produces successive signals representative of the information. These signals are then processed by signal processing circuitry and applied to and stored in succession in a main data register. The signals stored in the main data register are examined by detection logic circuitry to determine the nature thereof, that is, whether carrier vehicle information or piggyback vehicle information, and, based on these determinations, selectively steered into a "carrier" register or into a "piggyback" register and stored therein. Each signal applied to and stored in the "piggyback" register is read out therefrom shortly after being stored therein but prior to the departure of the carrier and piggyback vehicles from the label-reading area. The signal stored in the " carrier" register is read out in response to the departure of the carrier and piggyback vehicles from the label-reading area. Timing circuitry is also provided in the system for preventing multiple readings of a piggyback vehicle label.

17 Claims, 2 Drawing Figures

INVENTOR.
CHRISTOPHER C. REYNOLDS

DATA STORAGE AND TRANSFER APPARATUS FOR PLURAL-VEHICLE IDENTIFICATION SYSTEM

BACKGROUND OF THE INVENTION

The present invention relates to an information processing system and, more particularly, to a plural-vehicle identification system for identifying carrier vehicles and piggyback vehicles carried thereon, and for indicating the relationships of the piggyback vehicles to the carrier vehicle.

In recent years, various types of object identification systems and apparatus have appeared for sensing, decoding, and printing out coded information associated with moving objects. Included among the different types of identification systems are those which rely for their operation on principles of optics, radioactivity, magnetics, ultrasonics, and radio frequency.

As applied to such objects as vehicles, and particularly railway vehicles, it has been recognized that many of the various prior art systems of the above-mentioned types are theoretically capable of sensing single codes or coded labels disposed on vehicles presented in succession to code-reading equipment, and of providing individual printed readouts, arranged sequentially in a column format, identifying the vehicles. However, it has also been recognized that such systems are not suitable for identifying several physically-related vehicles, for example, railway piggyback vehicles disposed on a railway carrier vehicle, while at the same time positively and unambiguously indicating the relationships in the printed readouts of the "carried" vehicles to the "carrying" vehicle. The capability of a system of positively and unambiguously indicating the association between each carrier vehicle and the vehicles carried thereon becomes quite important on numerous occasions, for example, whenever it is necessary or desirable to reroute a particular vehicle from its present location on a carrier vehicle to another carrier vehicle or to some other destination. At such times, the present location of the vehicle must be readily ascertained.

One prior art system which is capable of identifying several interrelated vehicles and of indicating the relationships of the carried vehicles to the carrying vehicle requires the use of a plurality of separate scanners, one scanner at the level of the carrier vehicle and one scanner at each level at which a coded label on a carried vehicle is likely to appear. In operation, as the vehicles equipped with labels pass the scanners corresponding to the levels of the labels, information is sensed from each label and applied to a separate storage register corresponding to the particular label level. The information pertaining to the vehicles is then read out from the system in a predetermined association. A primary disadvantage of this system is that in large-scale transportation systems involving great numbers of vehicles, the multiplication of scanning equipment at each reading location can prove to be quite costly and impractical.

Many of the difficulties and disadvantages associated with the abovedescribed systems and apparatus have been overcome by a plural-vehicle identification system described in U.S. Pat. No. 3,553,433, to Gordon B. Sorli, entitled "Data Storage and Transfer Apparatus for Plural-Vehicle Identification Systems." As described in the above-identified patent, a carrier vehicle and piggyback vehicles positioned thereon are equipped with information-coded labels incorporating features distinguishing the carrier and piggy-back vehicle labels and, therefore, the two types of vehicles, from each other. By way of example, information may be encoded in a predetermined code position in each of the piggyback vehicle labels which differs from information encoded in the corresponding code position in the carrier vehicle label.

As the carrier and piggyback vehicles pass a scanning apparatus, the code information is sensed from each of the labels in succession by the scanning apparatus and coded signals representative of this information is stored in succession in a main data register. The coded signals stored in the main data register as a result of each label-reading operation are monitored to determine the nature thereof, that is, whether they represent carrier vehicle information or piggyback vehicle information. Based on the determinations, the various coded signals stored in the main data register are selectively gated from the main data register into a plurality of subsidiary carrier and piggyback vehicle storage registers corresponding to the various carrier and piggyback vehicles. Means are also provided, including comparator and logic gating circuitry, for preventing superfluous coded signals produced as a result of multiple readings of a label from being applied to the subsidiary registers. Multiple readings may occur, for example, when a carrier vehicle is moving very slowly or is stopped in front of the scanning apparatus while a piggyback vehicle label is being read. After all of the coded signals representative of the information encoded in the carrier and piggyback vehicle labels have been entered into and stored in the appropriate subsidiary carrier and piggyback vehicle storage registers, and upon the departure of the carrier vehicle from the label-reading location, the coded signals stored in the subsidiary carrier and piggyback vehicle storage registers are read out in a predetermined association. By way of example, the code signals representative of the information encoded in the carrier vehicle label may be read out first and followed by the readout of the coded signals representative of the information encoded in the piggyback vehicle labels.

Although the plural-vehicle identification system described in the above-identified patent to Sorli operates in an effective and satisfactory manner, there are certain railroad data processing system applications where, rather than waiting until the carrier vehicle has departed from the label-reading location to read out the coded signals representative of the information encoded in the piggyback vehicle labels, it is preferred to read out the coded signals representative of the information encoded in the piggyback vehicle labels as soon as possible after being acquired from these labels, and, in addition, prior to reading out the coded signals representative of the information encoded in the carrier vehicle label. It is also desired, in the context of such a system, to provide a simple apparatus for preventing the processing of superfluous coded signals derived as a result of multiple readings of a piggyback vehicle label, specifically, multiple readings of a piggyback vehicle label occurring as a result of a carrier vehicle moving very slowly or being stopped in front of scanning apparatus while a piggyback vehicle label is being read. The present invention is directed to a plural-vehicle identification system for accomplishing the above results.

SUMMARY OF THE INVENTION

Briefly, in accordance with the present invention, an information processing apparatus is provided for a system including a first object and a second object associated therewith. By way of example, the first object may be a railway carrier vehicle and the second object may be a railway piggyback vehicle or a cargo container disposed on the carrier vehicle. Each of the first and second objects is equipped with an information coded label, the information encoded in the first object label and in the second object label including features distinguishing the first and second object labels and, therefore, the two objects, from each other.

To process the information encoded in the first object label and in the second object label, the first and second objects are arranged to move through a label-reading area. During the presence of the first and second objects in the label-reading area, a label-reading means at the label-reading area operates to produce a pair of successive signals representative of the information encoded in the object labels, these signals including representations of the distinguishing features. Each of the signals produced by the label-reading means is selectively applied to a first storage means or to a second storage means. More specifically, a means coupled to the label-reading means and to the first and second storage means operates to determine whether each of the signals produced by the label-reading means represents information encoded in the first object label or information encoded in the second object label. If a signal is determined by said means to represent information encoded in the first object label, it is transferred to and stored in the first storage means; if a signal is determined to represent information encoded in the second object label, it is transferred to and stored in the second storage means. After the signal representative of the information encoded in the second object label has been stored in the second storage means, a first means operates to transfer this signal to an output connection. Significantly, in accordance with the invention, the first means causes this signal to be transferred to the output connection at a time prior to the departure of the first and second objects from the label-reading area. In contradistinction, the signal representative of the information encoded in the first object label and stored in the first storage means is transferred to the output connection, by a second means, in response to the departure of the first and second objects from the label-reading area.

DESCRIPTION OF PREFERRED EMBODIMENT - FIGS. 1 AND 2

Figure 1:
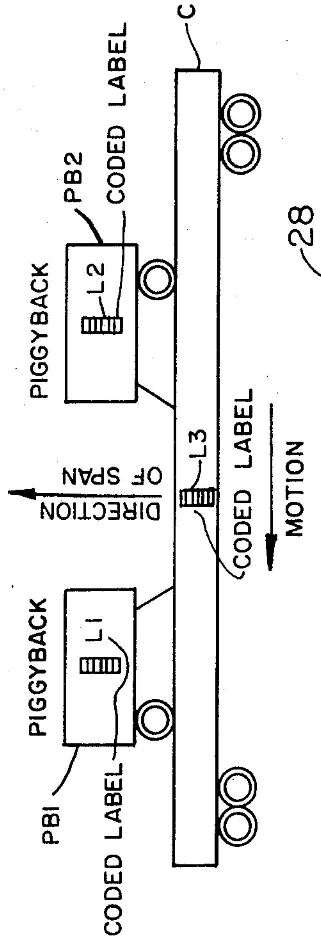
FIG. 1 is a pictorial representation of a typical multi-vehicle and labeling arrangement including a flat car carrier having a label attached thereto, and a pair of piggyback vehicles positioned on the flat car carrier and having labels attached thereto.

Referring to FIG. 1, there is shown a pictorial representation of a typical arrangement of railroad vehicles including a standard flat car carrier vehicle C, and a pair of standard piggyback vehicles PB1 and PB2 carried on the flat car carrier vehicle C. As indicated in FIG. 1, the piggyback vehicles PB1 and PB2 are equipped with vertically-oriented coded labels L1 and L2, respectively, and the carrier vehicle C is equipped with a vertically-oriented coded label L3. The coded labels L1–L3, which typically contain information identifying the respective vehicles PB1, PB2, and C, may assume a variety of different forms. However, a preferred form for each of the labels L1–L3 is described in detail in a copending application of Christos B. Kapsambelis, Thomas P. Morehouse, Robert H. Reif, and Francis H. Stites, Ser. No. 865,661 filed Oct. 13, 1969, now U.S. Pat. No. 3,617,704, issued Nov. 2, 1971, and entitled "Signal Processing System." A label as described in this application includes a plurality of rectangular orange, blue, and white retroreflective stripes, and black non-retroreflective stripes. The various retroreflective stripes and non-retroreflective stripes are arranged in selected pairs, in accordance with a two-position base-four code format, to represent successive blocks of information including a START control word, a plurality of decimal code digits, a STOP control word, and a parity check integer. For further or more specific details as to the nature of labels of the above preferred type, reference may be made to the aforementioned application of Kapsambelis et al.

Figure 2:
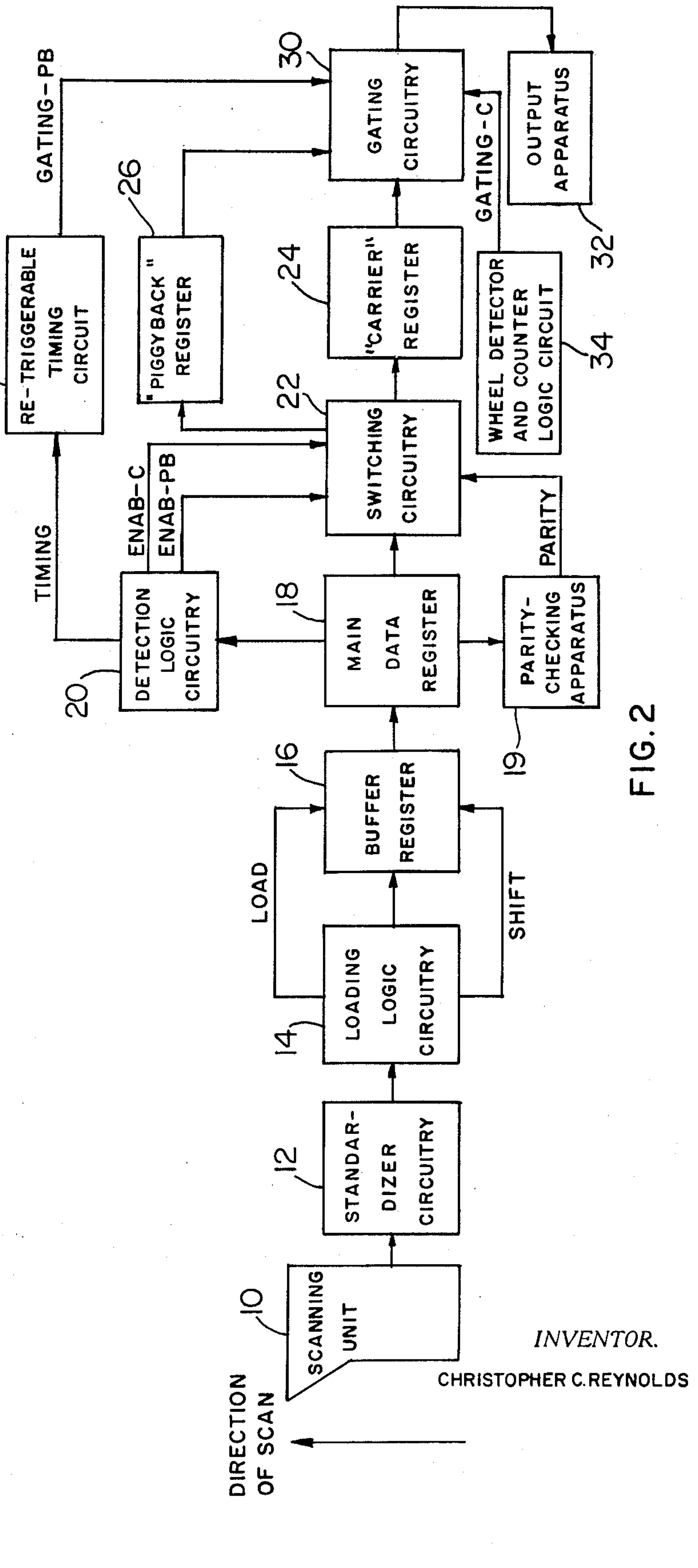
FIG. 2 is a block diagram of a plural-vehicle identification system in accordance with the present invention for processing the information encoded in the labels attached to the carrier and piggyback vehicles illustrated in FIG. 1.

To enable the apparatus of FIG. 2 to distinguish between the two types of vehicles, that is, between the carrier vehicle C and the piggyback vehicles PB1 and PB2, distinguishable features, capable of detection and discrimination by the apparatus of FIG. 2, are provided in the various coded labels L1–L3. By way of example, each of the coded piggyback vehicle labels L1 and L2 may be adapted to include a code digit in a predetermined position in the label which has a decimal value (e.g., a value of "2") differing from the decimal value (e.g., a value of "0") of a code digit in a corresponding position in the coded carrier vehicle label L3. Although it is generally preferred to employ the first digit position (following the START control word) of each of the labels L1–L3 to provide the distinguishing features between the two types of labels, any code digit position may actually be used. Moreover, other techniques for distinguishing between the two types of labels and, therefore, between the two types of vehicles, for example, employing individual vehicle distinguishing codes or different distinguishing bit widths, may be employed.

The apparatus of FIG. 2, which is employed to sense and process the information encoded in the piggyback vehicle labels L1 and L2 and in the carrier vehicle label L3, includes a scanning unit 10. The scanning unit 10 is adapted to vertically scan each of the coded labels L1–L3 with an incident beam of light as the carrier vehicle C and the piggyback vehicles PB1 and PB2 carried thereon pass by the scanning unit 10, and to convert the light reflected from the various labels into coded electrical output pulses representative of the information encoded in the labels. Suitable apparatus for implementing the scanning unit 10 is described in detail in U.S. Pat. No. 3,225,177, to Francis H. Stites and Raymond Alexander or, alternatively, in U.S. Pat. No. 3,456,997 to Francis H. Stites and Franklin L Feigin.

The output pulses produced by the scanning unit 10 are applied to standardizer circuitry 12. The standardizer circuitry 12, a suitable and preferred implementation of which is described in detail in U.S. Pat. No. 3,299,271, to Francis H. Stites, operates to convert each of the output pulses produced by the scanning unit 10 to a width and amplitude suitable for further processing. More specifically, and as described in detail in the patent to Stites, the standardizer circuitry 12 operates to measure the widths of the output pulses produced by the scanning unit 10 at the half-amplitude points and to convert the signals measured at the half-amplitude points into pulses each having a uniform, standardized amplitude.

The various standardized output pulses produced by the standardizer circuitry 12 during a scanning operation are applied to loading logic circuitry 14. A suitable and preferred implementation of the loading logic circuitry 14 is described in detail in the aforementioned patent application of Kapsambelis et al. The loading logic circuitry 14 operates in response to the various standardized output pulses produced by the standardizer circuitry 12 during a scanning operation to load the pulses into a buffer register 16, for temporary storage therein, and also to determine whether the pulses satisfy certain pre-established pulse-width and pulse-timing criteria for valid label-derived pulses. If the standardized output pulses received by the loading logic circuitry 14 and loaded into the buffer register 16 during a particular scanning operation satisfy the abovementioned pulse-width and pulse-timing criteria, they are shifted out of the buffer 16 into a main data register 18. The buffer register 16 and the main data register 18 may be of the general type described in the aforementioned patent to Stites and Alexander.

The various signals applied to and stored in the main data register 18 after reading each label, whether a carrier vehicle label or a piggyback vehicle label, and representing the information encoded in the label, that is, a START control word, a plurality of code digits, a STOP control word, and a parity check integer, are examined by parity-checking apparatus 19 and also by detection logic circuitry 20. The parity-checking apparatus 19, a suitable type of which is described in detail in U.S. Pat. No. 3,524,163, to Henry N. Weiss, operates to determine whether the signals applied to and stored in the main data register 18 satisfy system parity requirements and to apply a parity control signal to switching circuitry 22 if these parity requirements are met.

The detection logic circuitry 20, which may be readily implemented by a variety of conventional logic circuits well known to those skilled in the art, serves to determine whether the information stored in the main data register 18 after a given label-reading operation pertains to a carrier vehicle or to a piggyback vehicle. Based on these determinations, various control signals are produced by the detection logic circuitry 20 for selectively controlling the further processing of the signals stored in the main data register 18. More specifically, and as will be described more fully hereinafter, if the detection logic circuitry 20 detects the presence in the main data register 18 of signals representative of a START control word, a STOP control word, and the distinguishing feature incorporated in a carrier vehicle label, and in their proper locations in the main data register 18, an enabling control signal is produced by the detection logic circuitry 20 and applied to switching circuitry 22. Assuming that the signals stored in the main data register 18 satisfy system parity requirements as determined by the parity-checking apparatus 19, the switching circuitry 22, of a conventional design, operates to pass the signals stored in the main data register 18, pertaining to a carrier vehicle, to a so-called "carrier" register 24. In a similar fashion, if the detection logic circuitry 20 detects the presence, in the proper locations in the main data register 18, of the signals representative of a START control word, a STOP control word, and the distinguishing feature incorporated in a piggyback vehicle label, an enabling control signal is produced by the detection logic circuitry 20 and applied to the switching circuitry 22. Assuming again that these signals satisfy system parity requirements, as determined by the parity-checking apparatus 19, the switching circuitry 22 then operates to pass the signals, pertaining to a piggyback vehicle, to a so-called "piggyback" register 26.

As the detection logic circuitry 20 detects the presence of piggyback vehicle signals in the main data register 18, as described hereinabove, a timing control signal is also produced by the detection logic circuitry 20 and applied to a re-triggerable timing circuit 28. The timing circuit 28, which may be readily implemented by a variety of well-known circuit elements, serves to initiate transfer of piggyback vehicle signals stored in the "piggyback" register 26 out of the "piggyback" register 26 and also to prevent the processing of superfluous signals derived from certain multiple readings of a piggyback vehicle label. As will be explained in detail hereinafter, these multiple readings of a piggyback vehicle label can occur, for example, when a carrier vehicle is moving very slowly or is stopped in front of the scanning unit while a piggyback vehicle label is being read.

To initiate transfer of piggyback vehicle signals out of the "piggyback" register 26, the timing circuit 28 is adapted to initiate an output signal each time that piggyback vehicle data is detected in the main data register 18 by the detection logic circuitry 20 and to terminate the output gating signal at a predetermined fixed period of time after being enabled, or "triggered," by the detection logic circuitry 20. The output gating signal produced by the timing circuit 28 is then employed to gate the piggyback vehicle data in the "-piggyback" register 26 through the gating circuitry 30, of a conventional design, into a local or remote output apparatus 32. By way of example, the abovementioned fixed period of time for the timing circuit 28 may have a value equal to the duration of several scan cycles (e.g., 12 scan cycles, or approximately 50 milliseconds) of the scanning unit 10. In this fashion, it is made certain that piggyback vehicle signals pertaining to a particular piggyback vehicle are read out of the "piggyback" register 26 only after the piggyback vehicle label has safely passed from the view of the scanning unit 10.

To prevent processing of superfluous piggyback vehicle signals, as mentioned above, the timing circuit 28 is also adapted to be capable of being re-triggered, that is, to be "reset" and to initiate a new output gating signal, in response to successive timing control signals produced by the detection logic circuitry 20 as a result of multiple readings of a piggyback vehicle label. In this case, the re-triggering of the timing circuit 28 by the successive timing control signals produced by the detection logic circuitry 20 serves to prevent the termination of an output gating signal therefrom until after the last reading of the label has taken place, that is, until after the last timing control signal corresponding to the last reading of the label, has been produced by the detection logic circuitry 20.

To read out carrier vehicle signals stored in the "carrier" register 24, a gating signal is derived from a conventional wheel detector and counter logic circuit 34, at such time as the carrier vehicle departs from the label-reading area, and applied to the gating circuitry 30. The gating circuitry 30 operates in response to the gating signal from the wheel detector and counter logic circuit 34 to gate the carrier vehicle signals out of the "carrier" register 24 and into the output apparatus 32. Thus, with the particular arrangement of apparatus shown in FIG. 2, piggyback vehicle signals are read out of the "piggyback" register 26 shortly after being stored therein, and carrier vehicle signals are read out of the "carrier" register 24 upon the departure of the carrier vehicle from the view of the scanning unit 10. The output apparatus 32 typically includes computer, display, or printout apparatus.

The operation of the apparatus shown in FIG. 2 corresponding to the specific arrangement of vehicles PB1, PB2, and C of FIG. 1 is as follows. As the carrier vehicle C and the piggyback vehicles PB1 and PB2 pass by the scanning unit 10, the information encoded in the various labels L1–L3 is sensed by the scanning unit 10 in the sequence L1, L3, and L2. As a result of sensing the information encoded in the first label to pass the scanning unit 10, that is, the piggyback vehicle label L1, coded output signals representative of the information encoded in the label L1 are produced by the scanning unit 10. These coded output signals are then processed by the standardizer circuitry 12, the loading logic circuitry 14, and the buffer register 16, in the manner earlier indicated, and applied to and stored in the main data register 18. The detection logic circuitry 20 then operates to detect the presence, in the proper locations in the main data register 18, of the coded signals representative of the START control word, the STOP control word, and the distinguishing feature incorporated in the piggyback vehicle label L1. When these coded signals have been properly detected by the detection logic circuitry 20, and assuming that these signals satisfy system parity requirements as determined by the parity-checking apparatus 19, the switching circuitry 22 is enabled by the detection logic circuitry 20 so as to steer the coded piggyback vehicle (PB1) signals stored in the main data register 18 into the "piggyback" register 26. In addition, a timing control signal is produced and applied by the detection logic circuitry 20 to the re-triggerable timing circuit 28. Assuming that the carrier vehicle C is not moving very slowly or is not stopped in front of the scanning unit 10 while the piggyback vehicle label L1 is being read, a gating signal is produced by the timing circuit 28 at the predetermined fixed time (e.g., approximately 50 milliseconds) after being triggered by the detection logic circuitry 20. The gating signal produced by the timing circuit 28 is applied to the gating circuitry 30 and causes the coded signals stored in the "piggyback" register 26 to be gated to the output apparatus 32.

After the coded signals pertaining to the piggyback vehicle PB1 have been processed as indicated above, the information encoded in the carrier vehicle label L3 is next sensed by the scanning unit 10. In the same manner as earlier described, coded output signals representative of the information encoded in the carrier vehicle label L3 are produced by the scanning unit 10, processed by the standardizer circuitry 12, the loading logic circuitry 14, and the buffer register 16, and applied to and stored in the main data register 18. The detection logic circuitry 20 then operates to detect the presence, in the proper locations in the main data register 18, of the coded signals representative of the START control word, the STOP control word, and the distinguishing feature incorporated in the carrier vehicle label L3. When these coded signals have been properly detected by the detection logic circuitry 20, and assuming that these signals satisfy system parity requirements as determined by the parity-checking apparatus 19, the switching circuit 22 is enabled by the detection logic circuitry 20 so as to steer the coded carrier vehicle (C) signals stored in the main data register 18 to the "carrier" register 24.

After the coded signals pertaining to the carrier vehicle C have been applied to and stored in the "carrier" register 24, the information encoded in the piggyback vehicle label L2 next sensed by the scanning unit 10. In the same manner as earlier described, coded output signals representative of the information encoded in the piggyback vehicle label L2 are produced by the scanning unit 10, processed by the standardizer circuitry 12, the loading logic circuitry 14, and the buffer register 16, and applied to and stored in the main data register 18. As in the case of the piggyback vehicle label L1, the detection logic circuitry 20 then operates to detect the presence in the proper locations in the main data register 18, of the coded signals representative of the START control word, the STOP control word, and the distinguishing feature incorporated in the piggyback vehicle label L2. When these coded signals have been properly detected by the detection logic circuitry 20, and again assuming that these signals satisfy system parity requirements, the switching circuitry 22 is enabled by the detection logic circuitry 20 so as to steer the coded piggyback vehicle (PB2) signals stored in the main data register 18 into the "piggyback" register 26. In addition, a timing control signal is produced and applied by the detection logic circuitry 20 to the timing circuit 28. After the predetermined fixed period of time associated with the timing circuit 28 (approximately 50 milliseconds), a gating signal is produced by the timing circuit 28 and applied to the gating circuitry 30. The gating signal causes the coded signals stored in the "piggyback" register 26 to be gated to the output apparatus 32.

After the coded signals pertaining to the piggyback vehicle PB1 have been processed as indicated above, and upon the departure of the carrier vehicle C from the view of the scanning unit 10, a gating signal is produced by the wheel detector and counter logic circuit 34, indicating the departure of the carrier vehicle C, and applied to the gating circuitry 30. The gating circuitry 30 operates in response to the gating signal produced by the wheel detector and counter logic circuit 34 to gate the carrier vehicle (C) coded signals stored in the "carrier" register 24 to the output apparatus 32. Thus, with the particular arrangement of apparatus shown in FIG. 2, the coded signals representative of the information encoded in the piggyback vehicle labels L1 and L2 are read out in essentially real time (that is, after the predetermined fixed period of time associated with the timing circuit 28) and the coded signals representative of the information encoded in the carrier vehicle label L3 are read out after the carrier vehicle C has departed from the view of the scanning unit 10. In this fashion, the "carried" vehicles, that is, the piggyback vehicles PB1 and PB2, are associated with the "carrying" vehicle, that is, the carrier vehicle C. This association thereby enables one to readily locate either or both of the piggyback vehicles PB1 and PB2 at a later date without confusion or ambiguity. In the event the output apparatus 32 includes printout apparatus such as a teleprinter, the coded signals representative of the information encoded in the piggyback vehicle labels L1 and L2 may be printed out on a single line, in the sequence in which such signals are acquired, and followed on the same line by the printout of the coded signals representative of the information encoded in the carrier vehicle label L3. Other identifiable groupings are also possible.

CONCLUSION

Although a vehicle identification system has been described for processing information encoded in labels affixed to a carrier vehicle and to piggyback vehicles, it is to be appreciated that the system described is not limited to objects such as carrier vehicles and piggyback vehicles only. Thus, it is contemplated that one or more containers (e.g., cargo containers) be disposed on a carrier (e.g., a flat car carrier, a ship or a conveyor belt) and equipped with coded labels distinguishable in any suitable manner from the coded label affixed to the carrier. Other variations and modifications will be obvious to those skilled in the art without departing from the invention as called for in the appended claims.

What is claimed is:

1. In a system including a first object and a second object associated therewith, said first object and said second object each being equipped with an information coded label, the information encoded in the first object label and in the second object label including features distinguishing the first and second object labels from each other, said first and second objects being arranged to move through a label-reading area, information processing apparatus comprising:

label-reading means at the label-reading area operative during the presence of the first and second objects in the label-reading area to produce a pair of successive signals representative of the information encoded in the object labels, said signals including representations of said distinguishing features;

first and second storage means for storing signals produced by the label-reading means representative of the information encoded in the first object label and the information encoded in the second object label, respectively;

means coupled to the label-reading means and to the first and second storage means and operable to determine whether each of the signals produced by the label-reading means represents information encoded in the first object label or information encoded in the second object label and to selectively transfer the signals to the first and second storage means in accordance with the determinations, the signal representative of the information encoded in the first object label being transferred to and stored in the first storage means and the signal representative of the information encoded in the second object label being transferred to and stored in the second storage means;

first means operative after the signal representative of the information encoded in the second object label has been stored in the second storage means to transfer the signal to an output connection at a time prior to the departure of the first and second objects from the label-reading area; and second means operative in response to the departure of the first and second objects from the label-reading area to transfer the signal representative of the information encoded in the first object label and stored in the first storage means to the output connection.

2. In a system in accordance with claim 1 wherein the means coupled to the label-reading means and to the first and second storage means includes:

main storage means coupled to the label-reading means and adapted to store the signals produced by the label-reading means; and detector circuit means coupled to the main storage means and to the first and second storage means and adapted to recognize the representations of the distinguishing features and to direct the signal representative of the information encoded in the first object label from the main storage means to the first storage means and to direct the signal representative of the information encoded in the second object label from the main storage means to the second storage means.

3. In a system in accordance with claim 1 wherein the first object is a carrier vehicle and the second object is carried by the carrier vehicle.

4. In a system in accordance with claim 1 wherein the first object is a carrier vehicle and the second object is a piggyback vehicle carried by the carrier vehicle.

5. In a system including a first object and a second object associated therewith, said first object and said second object each being equipped with an information coded label, the information encoded in the first object label and in the second object label including features distinguishing the first and second object labels from each other, said first and second objects being arranged to move through a label-reading area, information processing apparatus comprising:

label-reading means at the label-reading area operative during the presence of the first and second objects in the label-reading area to produce a pair of successive signals representative of the information encoded in the first and second object labels, said signals including representations of said distinguishing features;

first and second storage means for storing signals produced by the label-reading means representative of the information encoded in the first object label and the information encoded in the second object label, respectively;

processing means coupled to the label-reading means and to the first and second storage means and operable to determine whether each of the signals produced by the label-reading means represents information encoded in the first object label or information encoded in the second object label and to selectively transfer the signals to the first and second storage means in accordance with the determinations, the signal representative of the information encoded in the first object label being transferred to and stored in the first storage means and the signal representative of the information encoded in the second object label being transferred to and stored in the second storage means;

circuit means coupled to the processing means and operative in response to the processing by the processing means of the signal produced by the label-reading means representative of the information encoded in the second object label to initiate an output condition and to terminate the output condition at a time subsequent to said processing, said subsequent time being prior to the departure of the first and second objects from the label-reading area;

means coupled to the circuit means and to the second storage means and operable in response to the termination of the output condition produced by the circuit means to transfer the signal representative of the information encoded in the second object label and stored in the second storage means to an output connection;

departure detection means operative in response to the departure of the first and second objects from the label-reading area to produce an output condition indicative of said departure; and means coupled to the departure detection means and to the first storage means and operable in response to the output condition produced by the departure detection means to transfer the signal representative of the information encoded in the first object label and stored in the first storage means to the output connections.

6. In a system in accordance with claim 5 wherein the processing means includes:

main storage means coupled to the label-reading means and adapted to store the signals produced by the label-reading means; and detector circuit means coupled to the main storage means and to the first and second storage means and adapted to recognize the representations of the distinguishing features and to direct the signal representative of the information encoded in the first object label from the main storage means to the first storage means and to direct the signal representative of the information encoded in the second object label from the main storage means to the second storage means.

7. In a system in accordance with claim 5 wherein the first object is a carrier vehicle and the second object is carried by the carrier vehicle.

8. In a system including a first object and a second object associated therewith, said first object and said second object each being equipped with an information coded label, the information encoded in the first object label and in the second object label including features distinguishing the first and second object labels from each other, said first and second objects being arranged to move through a label-reading area, information processing apparatus comprising:

label-reading means at the label-reading area operative during the presence of the first and second objects in the label-reading area to produce a pair of successive signals representative of the information encoded in the first and second object labels, said signals including representations of said distinguishing features;

first and second storage means for storing signals produced by the label-reading means representative of the information encoded in the first object label and the information encoded in the second object label, respectively;

processing means coupled to the label-reading means and to the first and second storage means and operable to determine whether each of the signals produced by the label-reading means represents information encoded in the first object label or information encoded in the second object label and to selectively transfer the signals to the first and second storage means in accordance with the determinations, the signal representative of the information encoded in the first object label being transferred to and stored in the first storage means and the signal representative of the information encoded in the second object label being transferred to and stored in the second storage means;

said processing means being further operable during the processing thereby of the signal produced by the label-reading means representative of the information encoded in the second object label to produce a timing control signal;

first circuit means adapted to receive the timing control signal produced by the processing means and operable in response thereto to initiate an output condition and to terminate the output condition at a subsequent time, said subsequent time being prior to the departure of the first and second objects from the label-reading area;

said first circuit means further being operable to initiate successive output conditions and to prevent termination of an output condition in response to successive timing control signals produced by the processing means having a time spacing therebetween less than the time occurring between the time of initiation and the time of termination of an output condition by the first circuit means, whereby if the movement of the second object causes multiple signals representative of the information encoded in the second object label to be produced in succession by the label-reading means and multiple successive timing control signals to be produced by the processing means having a time spacing therebetween less than the time occurring between the time of initiation and the time of termination of an output condition by the first circuit means, the first circuit means operates to terminate an output condition only upon the termination of the last one of the timing control signals produced by the processing means;

means coupled to the first circuit means and to the second storage means and operable in response to the termination of an output condition produced by the first circuit means to transfer the signal stored in the second storage means, representative of the information encoded in the second object label, to an output connection;

departure detection means operative in response to the departure of the first and second objects from the label-reading area to produce an output condition indicative of said departure; and means coupled to the departure detection means and to the first storage means and operable in response to the output condition produced by the departure detection means to transfer the signal stored in the first storage means, representative of the information encoded in the first object label, to the output connection.

9. In a system in accordance with claim 8 wherein the processing means includes:

main storage means coupled to the label-reading means and adapted to store the signals produced by the label-reading means; and detector circuit means coupled to the main storage means and to the first and second storage means and adapted to recognize the representations of the distinguishing features and to direct the signal representative of the information encoded in the first object label from the main storage means to the first storage means and to direct the signal representative of the information encoded in the second object label from the main storage means to the second storage means.

10. In a system in accordance with claim 8 wherein the first object is a carrier vehicle and the second object is carried by the carrier vehicle.

11. In a system including a first object and a plurality of other objects associated therewith, said first object and other objects each being equipped with an information coded label, the information encoded in the first object label and in the other object labels including features distinguishing the first object label from the other object labels, said first and other objects being arranged to move through a label-reading area, information processing apparatus comprising:

label-reading means at the label-reading area operative during the presence of the first and other objects in the label-reading area to produce in succession a plurality of signals representative of the information encoded in the object labels, said signals including representations of said distinguishing features;

first and second storage means for storing signals produced by the label-reading means representative of the information encoded in the first object label and the information encoded in an other object label, respectively;

processing means coupled to the label-reading means and to the first and second storage means and operable to determine whether each of the signals produced by the label-reading means represents information encoded in the first object label or information encoded in an other object label and to selectively transfer the signals to the first and second storage means in accordance with the determinations, the signal representative of the information encoded in the first object label being transferred to and stored in the first storage means and a signal representative of information encoded in an other object label being transferred to and stored in the second storage means;

first means operative after the storage of each signal representative of information encoded in an other object label and stored in the second storage means to transfer the signal to an output connection at a time prior to the departure of the first and other objects from the label-reading area; and second means operative in response to the departure of the first and other objects from the label-reading area to transfer the signal representative of the information encoded in the first object label and stored in the first storage means to the output connection.

12. In a system in accordance with claim 11 wherein the processing means includes:

main storage means coupled to the label-reading means and adapted to store the signals produced by the label-reading means; and detector circuit means coupled to the main storage means and to the first and second storage means and adapted to recognize the representations of the distinguishing features and to direct the signal representative of the information encoded in the first object label from the main storage means to the first storage means and to direct each signal representative of information encoded in an other object label from the main storage means.

13. In a system in accordance with claim 12 wherein the first object is a carrier vehicle and the other objects are carried by the carrier vehicel.

14. In a system including a first object and a plurality of other objects associated therewith, said first object and other objects each being equipped with an information coded label, the information encoded in the first object label and in the other object labels including features distinguishing the first object label from the other object labels, said first and other objects being arranged to move through a label-reading area, information processing apparatus comprising:

label-reading means at the label-reading area operative during the presence of the first and other objects in the label-reading area to produce in succession a plurality of signals representative of the information encoded in the object labels, said signals including representations of said distinguishing features;

first and second storage means for storing signals produced by the label-reading means representative of the information encoded in the first object label and the information encoded in an other object label, respectively;

processing means coupled to the label-reading means and to the first and second storage means and operable to determine whether each of the signals produced by the label-reading means represents information encoded in the first object label or information encoded in an other object label and to selectively transfer the signals to the first and second storage means in accordance with the determinations, the signal representative of the information encoded in the first object label being transferred to and stored in the first storage means and a signal representative of information encoded in an other object label being transferred to and stored in the second storage means;

said processing means being further operable during the processing thereby of each signal produced by the label-reading means representative of information encoded in an other object label to produce a timing control signal;

first circuit means adapted to receive each timing control signal produced by the processing means and operable in response thereto to initiate an output condition and to terminate the output condition at a subsequent time, said subsequent time being prior to the departure of the first and other objects from the label-reading area;

said first circuit means further being operable to initiate successive output conditions and to prevent termination of an output condition in response to successive timing control signals produced by the processing means having a time spacing therebetween less than the time occurring between the time of initiation and the time of termination of an output condition by the first circuit means, whereby if the movement of an other object causes multiple signals representative of the information encoded in the label associated therewith to be produced in succession by the label-reading means and multiple successive timing control signals to be produced by the processing means having a time spacing therebetween less than the time occurring between the time of initiation and the time of termination of an output condition by the first circuit means, the first circuit means operates to terminate an output condition only upon the termination of the last one of the timing control signals produced by the processing means;

means coupled to the first circuit means and to the second storage means and operable in response to each termination of an output condition produced by the first circuit means to transfer the signal then stored in the second storage means, representative of information encoded in an other object label, to an output connection;

departure detection means operative in response to the departure of the first and second objects from the label-reading area to produce an output condition indicative of said departure; and means coupled to the departure detection means and to the first storage means and operable in response to the output condition produced by the departure detection means to transfer the signal stored in the first storage means, representative of the information encoded in the first object label, to the output connection.

15. In a system in accordance with claim 14 wherein the processing means includes:

main storage means coupled to the label-reading means and adapted to store the signals produced by the label-reading means; and detector circuit means coupled to the main storage means and to the first and second storage means and adapted to recognize the representations of the distinguishing features and to direct the signal representative of the information encoded in the first object label from the main storage means to the first storage means and to direct each signal representative of information encoded in an other object label from the main storage means to the second storage means.

16. In a system in accordance with claim 14 wherein the first object is a carrier vehicle and the other objects are carried by the carrier vehicle.

17. In a system in accordance with claim 14 wherein the first object is a carrier vehicle and the other objects are piggyback vehicles carried by the carrier vehicle.

* * * * *